US012655910B2

(12) United States Patent
Lee et al.

(10) Patent No.: US 12,655,910 B2
(45) Date of Patent: Jun. 16, 2026

(54) SLUICE GATE

(71) Applicant: Misuk Lee, Incheon (KR)

(72) Inventors: Misuk Lee, Incheon (KR); Nuri Choi, Incheon (KR); Sori Choi, Jinju-si (KR)

(73) Assignee: Misuk Lee, Incheon (KR)

( * ) Notice: Subject to any disclaimer, the term of this patent is extended or adjusted under 35 U.S.C. 154(b) by 3 days.

(21) Appl. No.: 18/729,210

(22) PCT Filed: Jan. 21, 2023

(86) PCT No.: PCT/KR2023/001080
§ 371 (c)(1),
(2) Date: Jul. 16, 2024

(87) PCT Pub. No.: WO2023/140714
PCT Pub. Date: Jul. 27, 2023

(65) Prior Publication Data
US 2025/0109798 A1 Apr. 3, 2025

(30) Foreign Application Priority Data
Jan. 23, 2022 (KR) ........................ 10-2022-0009609

(51) Int. Cl.
| | |
|---|---|
| *F16K 1/20* | (2006.01) |
| *B66D 1/30* | (2006.01) |
| *E02B 5/08* | (2006.01) |
| *E02B 7/20* | (2006.01) |
| *E02B 7/40* | (2006.01) |

(Continued)

(52) U.S. Cl.
CPC .............. *F16K 1/2007* (2013.01); *B66D 1/30* (2013.01); *E02B 5/082* (2013.01); *E02B 7/205* (2013.01); *E02B 7/40* (2013.01); *E02B 8/04* (2013.01); *F16K 31/465* (2013.01)

(58) Field of Classification Search
CPC ........ F16K 1/2007; F16K 31/465; E02B 8/04; E02B 5/082; E02B 7/44; E02B 7/205; B66D 1/26; B66D 1/30; B66D 1/60
See application file for complete search history.

(56) References Cited

FOREIGN PATENT DOCUMENTS

| | | | |
|---|---|---|---|
| CN | 2521459 Y | * | 11/2002 |
| CN | 203960817 U | * | 11/2014 |

(Continued)

OTHER PUBLICATIONS

International Search Report for PCT/KR2023/001080 mailed May 11, 2023 from Korean Intellectual Property Office.

*Primary Examiner* — Marina A Tietjen

(74) *Attorney, Agent, or Firm* — Revolution IP, PLLC

(57) ABSTRACT

A sluice gate includes: a hinge coupled to the top of the discharge port of a sidewall of the water reservoir unit; a flap gate coupled to the hinge unit and rotating up and down around the hinge unit, wherein the flap gate is rotated downward to close the discharge port when overlapped with the sidewall of the water reservoir unit and is rotated upward to open the discharge port; a fan-shaped pull string pulley coupled to an upwardly facing surface of the flap gate when the flap gate is horizontal; a pull string lifting means installed above the water reservoir unit; and a pull string having one end connected to the pull string lifting means and the other end coupled to the flap gate, wherein a portion of the pull string is wound around the outer periphery of the pull string pulley that moves the flap gate.

3 Claims, 2 Drawing Sheets

(51) Int. Cl.
_E02B 8/04_ (2006.01)
_F16K 31/46_ (2006.01)

(56) References Cited

FOREIGN PATENT DOCUMENTS

| CN | 103911972 | B | * | 11/2015 | |
|---|---|---|---|---|---|
| CN | 108240490 | A | * | 7/2018 | ......... F16K 15/1821 |
| CN | 110761251 | A | * | 2/2020 | ............ E02B 7/205 |
| CN | 111466275 | A | * | 7/2020 | ........... F16K 3/0254 |
| CN | 211901611 | U | * | 11/2020 | |
| CN | 113623408 | A | * | 11/2021 | ......... F16K 37/0091 |
| JP | 2000170141 | A | * | 6/2000 | |
| JP | 2017-166128 | A | | 9/2017 | |
| KR | 20-0335790 | Y1 | | 12/2003 | |
| KR | 20-0405533 | Y1 | | 1/2006 | |
| KR | 10-2006-0106488 | A | | 10/2006 | |
| KR | 10-2009-0109938 | A | | 10/2009 | |
| KR | 10-1252187 | B1 | | 4/2013 | |
| KR | 10-1355949 | B1 | | 1/2014 | |
| KR | 10-1582592 | B1 | | 1/2016 | |

* cited by examiner

1 : SIDEWALL OF WATER RESERVOIR UNIT    2 : DISCHARGE PORT

3 : DRAINAGE CHANNEL                    10 : HINGE UNIT

20 : FLAP GATE                          30 : PULL STRING PULLEY

40 : PULL STRING                        50 : LIFTING MEANS

SLUICE GATE

TECHNICAL FIELD

The present invention relates to a sluice gate, and more specifically, to an opening and closing apparatus which is opened or closed in a method involving rotating around a hinge shaft.

BACKGROUND ART

There are conventional sluice gates which slide open or closed, and a structure for sliding is mounted on each of the sluice gates.

However, conventional slidable sluice gates have problems that it is difficult to seal, foreign matter is fixed to the sliding structure and the gate, a failure or leakage occurs, etc.

In addition, there are conventional sluice gates in a flap gate type, and in the case of these sluice gates, a complex structure or hydraulic apparatus is required for opening or closing a flap gate.

However, an opening and closing method of the conventional flap gate has disadvantages that it requires a complex structure and has a risk of oil leakage and failure when a hydraulic pressure is used for driving.

In addition, conventional purification plant sedimentation basin drain valves have a slide type structure in which there is no movement of slurry, which has a disadvantage that blockage and the like occur due to fixation of sand or slurry to a bottom of a water storage tank.

Korean Registered Patent No. 10-1355949
Korean Registered Patent No. 10-1252187
Korea Registered Utility Model No. 20-0405533

Technical Problem

The present invention is directed to solving the problems of the conventional technology and providing an apparatus which moves and crushes precipitated sand, slurry, and the like to smoothly remove and easily discharge the slurry when a sluice gate is opened and in which an existing crushing apparatus separately used in a sedimentation basin or the like is not required, a structure is a simple, there is no leakage because sealing force using water pressure is superior, resources are not wasted, energy consumption is reduced, and maintenance is easy.

Technical Solution

In order to achieve the above objectives, one aspect of the present invention provides a sluice gate which opens or closes a discharge port formed in a water reservoir unit which stores water to definitely discharge or store the water in the water reservoir unit and includes a hinge unit coupled to a portion above the discharge port on a sidewall of the water reservoir unit, a flap gate coupled to the hinge unit, vertically rotated around the hinge unit, rotated downward to overlap the sidewall of the water reservoir unit to close the discharge port, and rotated upward to open the discharge port, a fan-shaped pull string pulley which is formed in a fan shape and attached and coupled to the flap gate capable of opening or closing the discharge port by converting horizontal motion into rotational motion using a vertical lifting means using the pull string pulley, a pull string lifting means installed above the water reservoir unit, and a pull string which has a structure of which one end is connected to the pull string lifting means, the other end is coupled to the flap gate, and a portion is wound around an outer circumferential surface of the pull string pulley which operates such that the flap gate closes the discharge port.

In addition, a wire or a chain, which is used for an apparatus at a deep-water level and with a heavy load, may be used as the pull string.

Advantageous Effects

As described above, in a sluice gate according to the present invention, there is an advantage that there is no water leakage because there is a definite sealing force caused by action of water pressure of water of a water reservoir unit when compared to a sluice gate having a conventional sliding structure, and accordingly there are advantages that resources are not wasted, energy consumption is reduced, and a problem generated when foreign matter is fixed to a sliding type structure is solved.

In addition, the sluice gate according to the present invention has an advantage of low failure risk because a complex structure such as a hydraulic device is not required.

In addition, in the sluice gate according to the present invention, since a flap gate is opened while stirring sand or slurry piled up on a bottom of the water reservoir unit, the sand or slurry precipitated in the water reservoir unit is pushed, moved, and crushed so that the sand or slurry can be discharged well. In addition, since there is an effect of discharging water well, there is an advantage that a separate crushing apparatus is not required.

MODES OF THE BEST INVENTION

Hereinafter, specific embodiments of the present invention will be described in detail with reference to the accompanying drawings.

Figure 1:
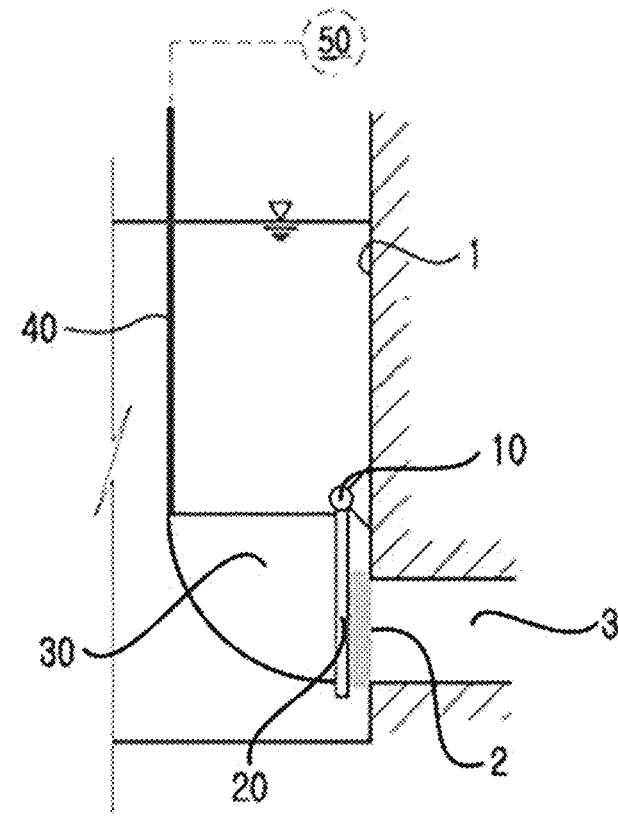
FIG. 1 is a side view illustrating a state in which a flap gate is closed by a sluice gate according to the present invention.
Figure 2:
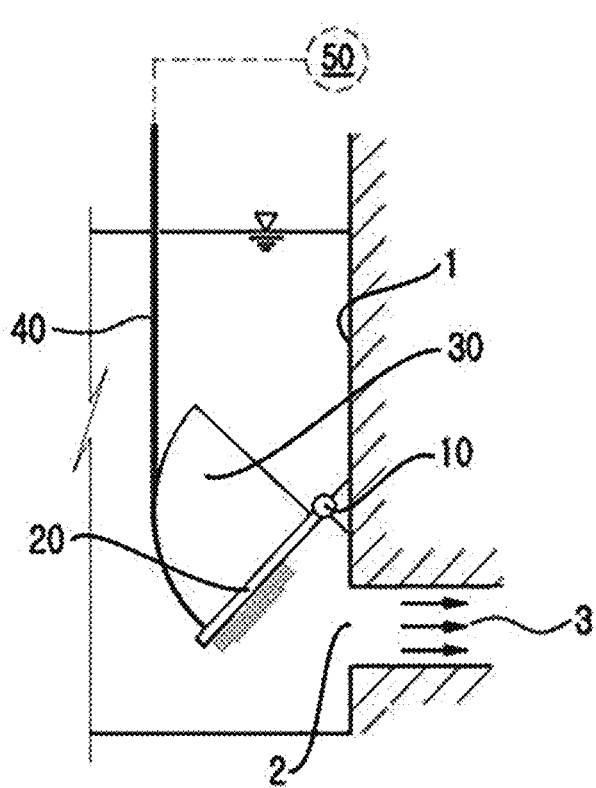
FIG. 2 is a side view illustrating a state in which the flap gate is opened by the sluice gate according to the present invention.

FIGS. 1 and 2 are configuration diagrams illustrating a sluice gate according to the present invention, wherein FIG. 1 shows a closed state of a discharge port 2, and FIG. 2 shows an open state of the discharge port 2 by the sluice gate according to the present invention.

The sluice gate according to the present invention includes a hinge unit 10, a flap gate 20, a pull string pulley 30, a pull string 40, and a pull string lifting means 50.

A water reservoir unit may be a structure having a space in which water may be stored, or may be a purification plant sedimentation basin, filter basin, drainage basin, or the like, and the concept may include all structures which store water and discharge the water as necessary, such as a dam, a waterway, a hydroponic cultivation structure, a paddy, etc.

The sidewall 1 of the water reservoir unit is a wall structure having a lower portion in which a discharge port 2 allowing water to be discharged is formed, and the discharge port 2 serves as an entrance of a drainage channel 3 which is a passage through which the water is discharged from the water reservoir unit.

The hinge unit 10 is a shaft for rotating the flap gate 20, and the hinge unit 10 is fixedly installed in a portion of the sidewall 1 of the water reservoir unit above the discharge port 2.

The flap gate 20 is coupled to the hinge unit 10 and vertically rotates around the hinge unit 10. When the flap gate 20 rotates downward to overlap the sidewall 1 of the water reservoir unit, the discharge port 2 is closed. When the flap gate 20 rotates upward, the discharge port 2 is opened.

The pull string pulley 30 has a fan-shaped structure and is coupled to a surface opposite to a surface toward the discharge port 2 among both surfaces of the flap gate 20 in a state in which the flap gate 20 closes the discharge port 2. A guide groove, chain gear, or the like, into which the pull string 40 is inserted to guide movement of the pull string 40, is formed in an outer circumferential surface of the pull string pulley 30.

As illustrated in FIGS. 1 and 2, as the pull string pulley 30 is configured such that an arc portion of the fan-shaped pull string pulley 30 faces downward in a state in which the flap gate 20 is closed, when the flap gate 20 is closed, a portion of the pull string 40 is inserted into the guide groove of the pull string pulley 30 such that a lower end portion of the pull string 40 is wound around the outer circumferential surface of the pull string pulley 30.

A wire is generally adopted as the pull string 40. However, when a water level is deep, since the strength of the wire is not sufficient, in this case, a chain or the like may be adopted thereas. When the chain is used as the pull string 40, the chain gear is provided as the pull string pulley 30.

A pneumatic cylinder or actuator used for an existing apparatus may be used as the pull string lifting means 50, and a winch may be used in some cases.

The operation of the above-described sluice gate according to the present invention will be described below.

FIG. 1 shows a state in which the flap gate 20 rotates downward to overlap the sidewall 1 of the water reservoir unit so that the discharge port 2 is closed by the flap gate 20. In this case, pressure of water stored in the water reservoir unit pushes the flap gate 20 to significantly increase a sealing force of the flap gate 20 so that a definite sealing force is generated.

In this way, when it rains or water flows therein while the discharge port 2 is closed, a water level of the water reservoir unit increases, and it becomes necessary to discharge the water. In addition, it becomes necessary to discharge slurry piled up in the water reservoir unit through the drainage channel 3 in order to discharge the slurry.

In this case, as illustrated in FIG. 2, when the pull string lifting means 50 is operated so that the pull string 40 is pulled upward, the pull string 40 lifts the pull string pulley 30 upward to rotate the pull string pulley 30 and the flap gate 20 integrally coupled to the pull string pulley 30.

Accordingly, the discharge port 2 closed by the flap gate 20 is opened, and water in the water reservoir unit is discharged through the discharge port 2 and the drainage channel 3.

However, when the flap gate 20 is lifted upward, since the flap gate 20 serves to lift and move the sand and the slurry precipitated in the water reservoir unit upward and form a gap through which the water passes, the sediment and water can be discharged well.

Although only specific exemplary embodiments of the present invention have been described above, it is clear to those skilled in the art that the present invention may be variously changed and modified within the spirit and the scope of the present invention based on the specific exemplary embodiments, and accordingly, such changes and modifications fall within the scope of the appended claims.

Modes of the Invention

A sluice gate is installed in a lower portion, in which fluid is stored, to discharge the fluid.

INDUSTRIAL APPLICABILITY

Alternative demand, such as replacement of a conventional sliding gate, is expected by contributing to energy saving and securing an appropriate amount of water through complete sealing.

Sequence List Free Text

It can be installed in a sedimentation basin of a purification plant, a distributing reservoir, a farm waterway, a dam, etc.

The invention claimed is:

1. A sluice gate for opening or closing a discharge port formed in a sidewall of a water reservoir unit which stores water, the sluice gate comprising:

a hinge unit coupled to a portion above the discharge port on the sidewall of the water reservoir unit;

a flap gate which is coupled to the hinge unit, vertically rotated around the hinge unit, rotated downward to overlap the sidewall of the water reservoir unit to close the discharge port, and rotated upward to open the discharge port;

a pull string pulley having a fan-shaped structure coupled to a surface opposite to a surface facing the discharge port among both surfaces of the flap gate when the flap gate closes the discharge port, wherein a guide groove into which the pull string is inserted to guide movement of the pull string is formed on an outer circumferential surface of the pull string pulley;

a pull string lifting means installed above the water reservoir unit; and a pull string of which one end is connected to the pull string lifting means, the other end is coupled to the flap gate, and a portion is wound around an outer circumferential surface of the pull string pulley when the flap gate operates to close the discharge port.

2. The sluice gate of claim 1, wherein the pull string includes a wire or chain.

3. The sluice gate of claim 1, wherein the flap gate is configured to be rotatable upward until the pull string pulley comes into contact with the sidewall of the water reservoir unit.

* * * * *